(12) United States Patent
Kobayashi

(10) Patent No.: US 6,744,981 B2
(45) Date of Patent: Jun. 1, 2004

(54) CAMERA WITH DIAPHRAGM RESTRICTION CLEARING SECTION

(75) Inventor: Kiyotaka Kobayashi, Saitama (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/244,676

(22) Filed: Sep. 17, 2002

(65) Prior Publication Data
US 2003/0059215 A1 Mar. 27, 2003

(30) Foreign Application Priority Data

Sep. 21, 2001 (JP) ........................... 2001-280964

(51) Int. Cl.[7] ................................. G03B 7/00
(52) U.S. Cl. ........................... 396/64; 396/257
(58) Field of Search ................ 396/63, 64, 257, 396/449

(56) References Cited

U.S. PATENT DOCUMENTS 6,088,534 A * 7/2000 Tominaga et al. ............ 396/64

FOREIGN PATENT DOCUMENTS

JP 10-150598 6/1998

* cited by examiner

Primary Examiner—Russell Adams
Assistant Examiner—Arthur A Smith
(74) Attorney, Agent, or Firm—Sughrue Mion, PLLC

(57) ABSTRACT

It is an object of the present invention to provide a camera that can take a bright photograph in a dark place. If a light value is equal to or smaller than a predetermined value, an aperture regulation for a diaphragm is cleared, and the aperture of the diaphragm is set at a value within a range between a first maximum value and a second maximum value smaller than the first maximum value depending on the light value measured by a photometric section, the range including the first maximum value itself.

6 Claims, 6 Drawing Sheets

CAMERA WITH DIAPHRAGM RESTRICTION CLEARING SECTION

BACKGROUND OF THE INVENTION

1. Field of the Invention

The present invention relates to a camera that carries out photographing by capturing object light entered via a photographing optical system.

2. Description of the Related Art

Cameras have hitherto been known which comprise a photographing optical system having a variable focal distance, e.g. a zoom lens to take a photograph on a photograph film. A camera comprising a zooming lens uses a so-called zooming function that varies a magnifying power by varying a focal distance to enable more variable framing than a camera comprising a single focus lens, e.g. enable a far object to be photographed as a larger image than the latter.

The maximum aperture of a camera comprising a zoom lens is determined, when the camera is designed, on the basis of the focal distance measured when the zoom lens is set to use a long focal distance as well as an F value of the zoom lens. However, if the zoom lens of the camera is set to use a short focal distance, when a photograph is taken with the diaphragm opened so as to obtain the maximum aperture, the quantity of light in peripheral portions of the angle of view of the photograph decreases compared to a central portion thereof, so that peripheral portions of the resulting photograph, notably the four corners thereof appear dark. It is known that the decrease in quantity of peripheral light can be resolved by reducing the aperture of the open diaphragm by about one or two levels.

Thus, for a camera comprising a zoom lens, a decrease in quantity of peripheral light is resolved by employing a diaphragm comprising an aperture regulating mechanism that regulates the aperture to a value smaller than the above described maximum value if the zoom lens is set to use a short focal distance.

In general, with a camera comprising a photographing lens with a focal distance of about 30 mm, a shutter speed of 1/30 second is said to be the lowest shutter speed at which photographing can be achieved without using any fixture such as a tripod, i.e. without being affected by image shakes.

However, with the camera comprising the diaphragm aperture regulating mechanism, to prevent a decrease in quantity of peripheral light described above, the zoom lens is set to use a short focal distance to regulate the aperture of the diaphragm to a value smaller than the maximum value, so that when a photograph is taken in a dark place, the photograph appears dark. In this case, to obtain a brighter photograph, the shutter speed may be reduced. However, when the shutter speed is reduced to shorter than 1/30 second, a fixture such as a tripod is required to prevent image shakes.

SUMMARY OF THE INVENTION

In view of these circumstances, it is an object of the present invention to provide a camera that can take a bright photograph in a dark place.

To attain the above object, the present invention provides, according to a first aspect thereof, a camera comprising a photographing optical system having a variable focal distance and a diaphragm having a maximum aperture regulated, in response to the photographing optical system being set to use a predetermined focal distance or shorter, to a second value smaller than a first value used when the photographing optical system is set to use a predetermined long focal distance, the camera carrying out photographing by capturing object light entered via the photographing optical system and the diaphragm, the camera further comprising:

a photometric section that measures a light value; and a diaphragm restriction clearing section that clears an aperture regulation for the diaphragm and sets the aperture of the diaphragm at a value within a range between the first maximum value and the second maximum value depending on the light value measured by the photometric section, the range including the first maximum value itself, if the light value measured by the photometric section is equal to or smaller than a predetermined value.

In general, if a photograph is taken in a dark place, e.g. a night view is photographed, a decrease in quantity of peripheral light does not substantially affect the resultant photograph. The present invention is completed in view of this point. If the light value is equal to or smaller than a predetermined value, the aperture regulation is cleared, and the aperture of the diaphragm is set at a value within a range between a maximum value obtained when the photographing lens is set to use a predetermined long focal distance and a second maximum value smaller than the first maximum value, depending on the light value measured by the photometric section, the range including the first maximum value itself. Accordingly, a camera is implemented wherein when a photograph is taken in a dark place where a decrease in quantity of peripheral light does not affect the resultant photograph, a bright photograph can be taken without using any fixture.

In this case, the diaphragm restriction clearing section may set the aperture of the diaphragm at the first maximum value when the aperture regulation for the diaphragm is cleared.

When the aperture is set at the first maximum value, no mechanisms are required which regulate the aperture to a value between the first maximum value and the second maximum value. Consequently, the structure of the diaphragm is simplified.

In a preferred aspect, the diaphragm restriction clearing section clears the aperture regulation for said diaphragm if the light value measured by said photometric section is equal to or smaller than a predetermined value set equal to or smaller than LV6.

Thus, the light value at which the aperture regulation for the diaphragm is cleared is preferably set equal to or smaller than LV6, which is smaller than that obtained when a photograph is taken indoors.

Further, preferably, the camera has a photosensitized material loaded therein to take a photograph on the photosensitized material.

The present invention focuses on the fact that photographing of a night view is not affected even by the aperture of the diaphragm with which a decrease in quantity of peripheral light is noticeable when a photograph is taken in a well lighted place. For a digital camera, image processing may be used to correct the decrease in quantity of peripheral light on image data after photographing. However, for a camera of a type that takes a photograph on a photosensitized material, the decrease in quantity of peripheral light cannot be corrected. Therefore, the present invention is suitable for a camera of a type that takes a photograph on a photosensitized material. However, even for a digital camera, application of the present invention eliminates the need to take trouble to correct the decrease in quantity of peripheral light by image processing.

To attain the above object, the present invention provides, according to a second aspect thereof, a camera comprising a photographing optical system and a diaphragm which is opened so as to obtain a predetermined first maximum aperture and which has the maximum aperture regulated to a predetermined second value smaller than the first value, the camera carrying out photographing by capturing object light entered via the photographing optical system and the diaphragm, the camera further comprising:

a photometric section that measures a light value; and a diaphragm restriction clearing section that clears an aperture regulation for the diaphragm and sets the aperture of the diaphragm at a value within a range between the first maximum value and the second maximum value depending on the light value measured by the photometric section, the range including the first maximum value itself, if the light value measured by the photometric section is equal to or smaller than a predetermined value.

According to the camera according to the second aspect, if the light value measured by the photometric section is equal to or smaller than a predetermined value, the aperture regulation for the diaphragm is cleared and the aperture of the diaphragm is set at a value between the first maximum value and the second maximum value smaller than the first maximum value depending on the light value measured by the photometric section. Consequently, when a photograph is taken in a well lighted place, the quantity of peripheral light is reduced. On the other hand, when a photograph is taken in a dark place, the range in which a bright photograph can be taken is increased without using any fixture.

DETAILED DESCRIPTION OF THE PREFERRED EMBODIMENTS

Embodiments of the present invention will be described below.

Figure 1:
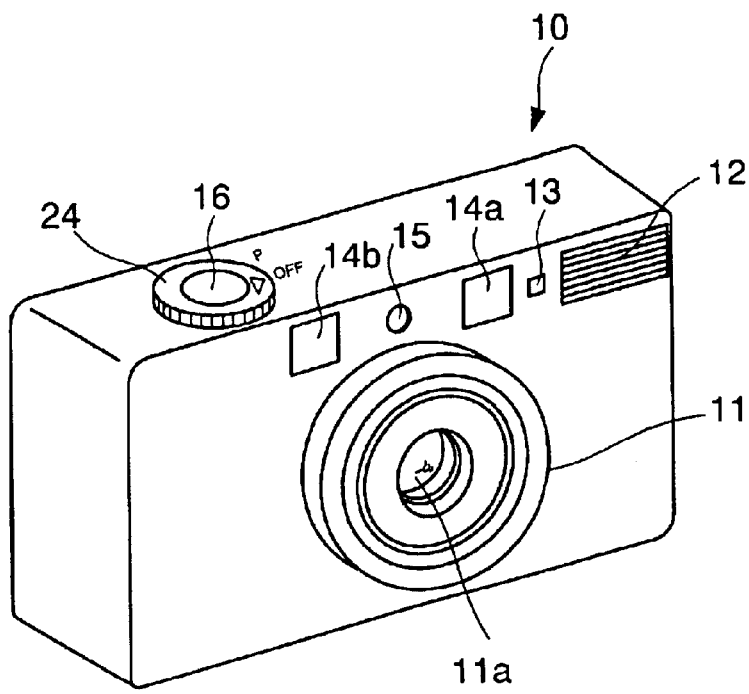
FIG. 1 is a perspective view of a collapsed state of a camera according to an embodiment of the present invention in which a zoom lens barrel supporting a zoom lens mounted in the camera as an example of a photographing lens having a variable focal distance is housed in the camera main body.
Figure 2:
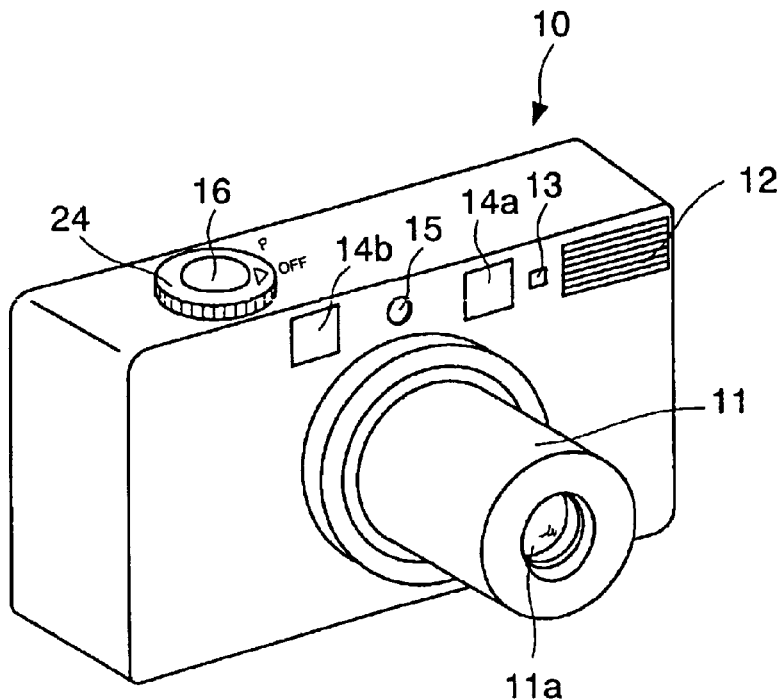
FIG. 2 is a perspective view of a maximum extended state of the camera shown in FIG. 1 wherein the zoom lens barrel is extended to its maximum length.

FIG. 1 is a perspective view of a collapsed state of a camera according to an embodiment of the present invention in which a zoom lens barrel supporting a zoom lens mounted in the camera as an example of a photographing optical system having a variable focal distance is housed in the camera main body. FIG. 2 is a perspective view of a maximum extended state of the camera shown in FIG. 1 wherein the zoom lens barrel is extended to its maximum length.

A camera 10, shown in FIGS. 1 and 2, takes a photograph on a photograph film (not shown).

The camera 10 is provided with a zoom lens barrel 11 arranged in a central portion of a front surface thereof and containing a zoom lens 11a. Further, in an upper part of the front surface of the camera 10 are provided a flash light emitting window 12, a finder objective window 13, an auto focus (AF) flooding window 14a containing an AF light emitting element, an AF light receiving window 14b containing a light receiving element that receives light flooded by the AF flooding window 14a and then reflected by an object, and an AF light receiving window 15 which is used to measure a light value (hereinafter referred to as an "LV") and which guides light to a built-in AE sensor 151 used to adjust exposure.

Further, the camera 10 is provided with a shutter button 16 and a rotary select dial 24 on a top surface thereof. Switching to the OFF state shown in FIGS. 1 and 2 or to a program mode (P) can be achieved by rotating the select dial 24 to align an index printed on the select dial 24 with a relevant mode printed on the top surface of the camera 10.

Figure 3:
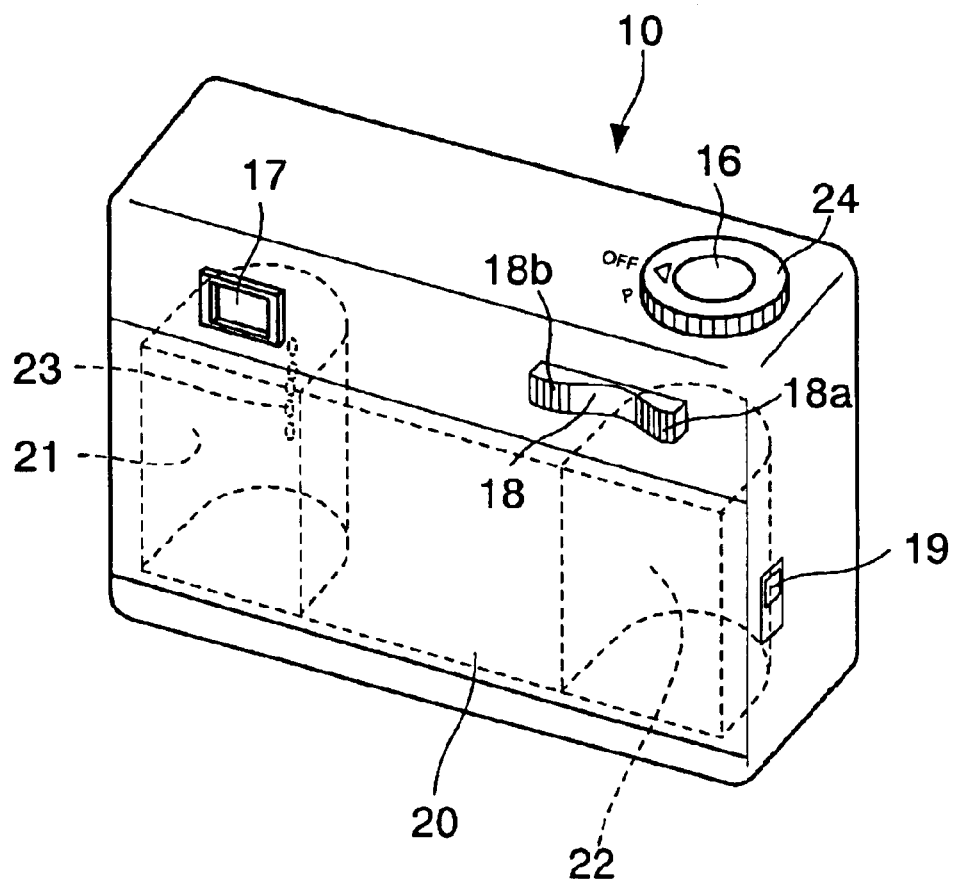
FIG. 3 is a perspective view of a rear surface of the camera shown in FIGS. 1 and 2, as viewed diagonally from above.

FIG. 3 is a perspective view of a rear surface of the camera shown in FIGS. 1 and 2, as viewed diagonally from above.

The camera 10 is provided with a finder ocular window 17 and a zoom operation lever 18 both on the rear surface thereof. When an operation section 18a arranged on one side of the zoom operation lever 18 is depressed, the zoom lens barrel 11 is moved from its collapsed state, shown in FIG. 1, toward its maximum extended state, shown in FIG. 2, while the operation section 18a remains depressed. When an operation section 18b arranged on the other side of the zoom operation lever 18 is depressed, the zoom lens barrel 11 is moved from its maximum extended state, shown in FIG. 2, toward its collapsed state, shown in FIG. 1, while the operation section 18b remains depressed.

Further, the camera 10 is provided with a rear cover 20 on the rear surface thereof to protect photographic films when a cartridge (not shown) having the photographic films housed therein is loaded in the camera 10. The camera 10 is provided with a rear cover control 19 on a side thereof to open the rear cover 20.

Furthermore, the camera 10 is internally provided with a film feeding chamber 21 and a film windup chamber 22. The rear cover control 19 is operated to open the rear cover 20, and a cartridge (not shown) is loaded into the film feeding chamber 21. Moreover, the film feeding chamber 21 is equipped with a DX code detecting pin 23 on a wall surface of the film feeding chamber 21. When a cartridge with a DX code printed thereon and which stores information such as the ISO sensitivity of the photograph films housed in the cartridge is loaded into the film feeding chamber 21 and the rear cover 20 is then closed, a DX code detecting pin 23 reads the DX code through automatic recognition to set the camera 10 to accommodate the ISO sensitivity stored in the DX code.

In the OFF state, the camera 10 is not powered by batteries (not shown). When the select dial 24 is rotated to switch to the program mode (P), the camera 10 is powered to allow a photograph to be taken.

In the program mode (P), depending on the ISO sensitivity set by the DX code detecting pin 23, one of the two programs described later is automatically selected. Then, according to the selected program, a combination of aperture and shutter speed corresponding to the LV measured by the above described AE sensor is automatically set. Subsequently, a photograph is taken on the basis of the set combination of the aperture and the shutter speed.

Figure 4:
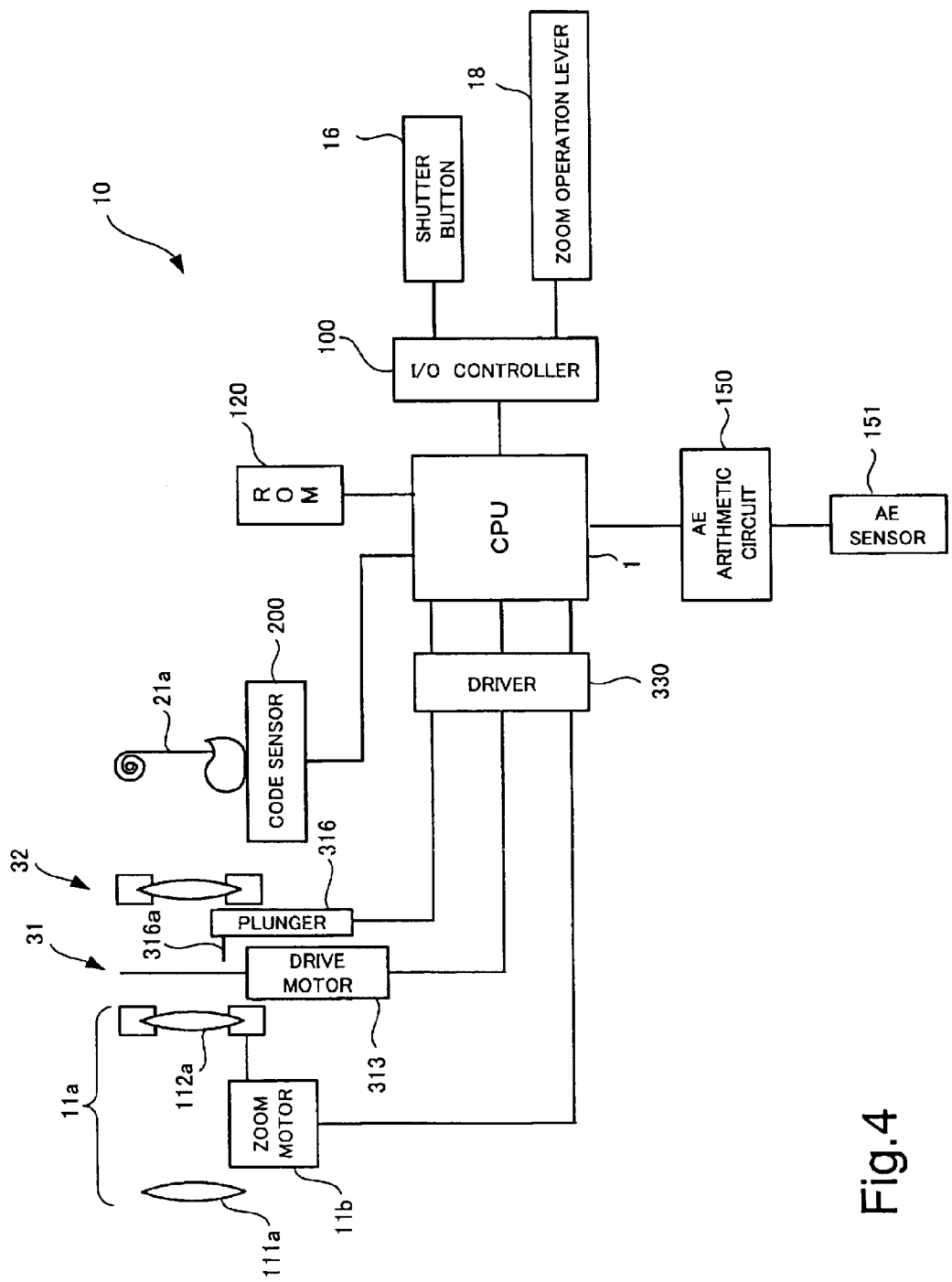
FIG. 4 is a block diagram of the interior of a camera according to this embodiment.

FIG. 4 is a block diagram of the interior of a camera according to this embodiment.

FIG. 4 shows a CPU 1 that controls the operation of the entire camera 10, a ROM 120 that stores a reference table described as a program diagram, described later, a zoom lens 11a composed of a fixed lens 111a and a movable lens 112a, a zoom motor 11b that moves the movable lens 112a in the direction of an optical axis, a shutter mechanism 31 also acting as a diaphragm mechanism, and a focus lens 32.

The shutter mechanism 31 is composed of two shutter blades, a drive motor 313 that drives these shutter blades, and a plunger 316 from which a pin 316a is projected, the pin 316a regulating a diaphragm aperture formed by these shutter blades.

FIG. 4 also shows a driver 330 that controls driving of the zoom motor 11b, drive motor 313, and plunger 316 respectively, a code sensor 200 that reads a DX code on a cartridge with a film 21a loaded therein, a shutter button 16 having a two-staged structure so as to be half or fully depressed, an AE arithmetic circuit 150 that determines exposure on the basis of an LV detected by the AE sensor 151, and an I/O controller 100 that transmits operations on the shutter button 16 or zoom operation lever 18 to the CPU.

With this camera 10, once a zooming operation is completed using the zoom operation lever and the shutter button 16 is half depressed with an object set in the center of the angle of view, the focus lens 32 is moved on the optical axis, and the AE arithmetic circuit 150 determines exposure.

The AE arithmetic circuit 150 first calculates an exposure value (hereinafter referred to as an "EV") on the basis of the LV detected by the AE sensor 151 and the information on the ISO sensitivity of the film loaded in the camera, the sensitivity being already detected by the code sensor 200.

Figure 7:
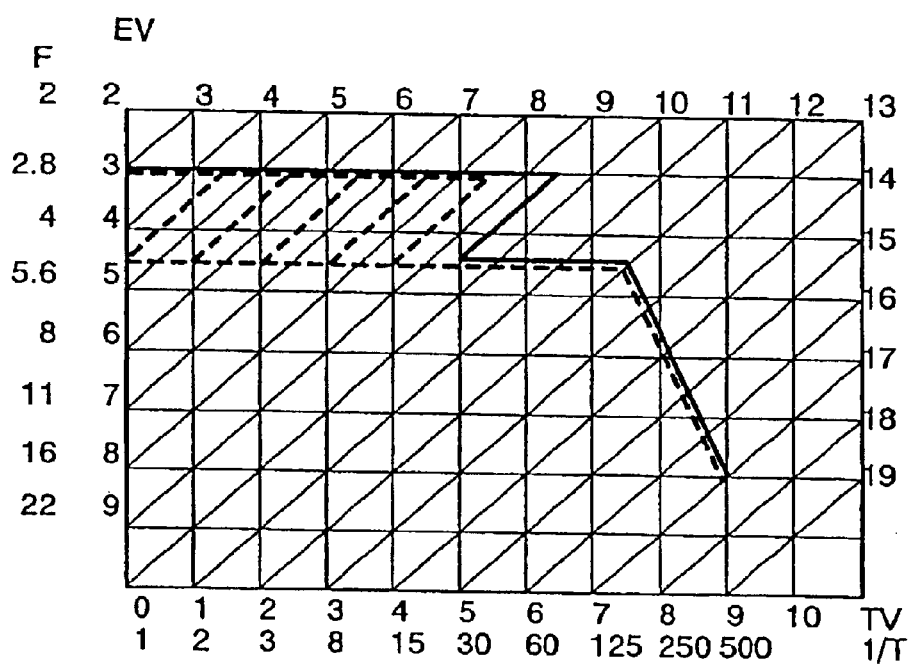
FIG. 7 is a program diagram showing a combination of an aperture value and shutter speed corresponding to each EV, for the camera of this embodiment.

Furthermore, on the basis of the calculated EV, the AE arithmetic circuit 150 references a table described as a program diagram as shown in FIG. 7 and corresponding to the current focal distance of the zoom lens 11a, to determine the shutter speed. Subsequently, when the shutter button is fully depressed, the camera 10 takes a photograph at the determined shutter speed. Further, the aperture is determined depending on the shutter speed. In FIG. 4, the AF arithmetic circuit, a focusing mechanism, a finder mechanism, and other components irrelevant to the present invention are omitted.

Figure 5:
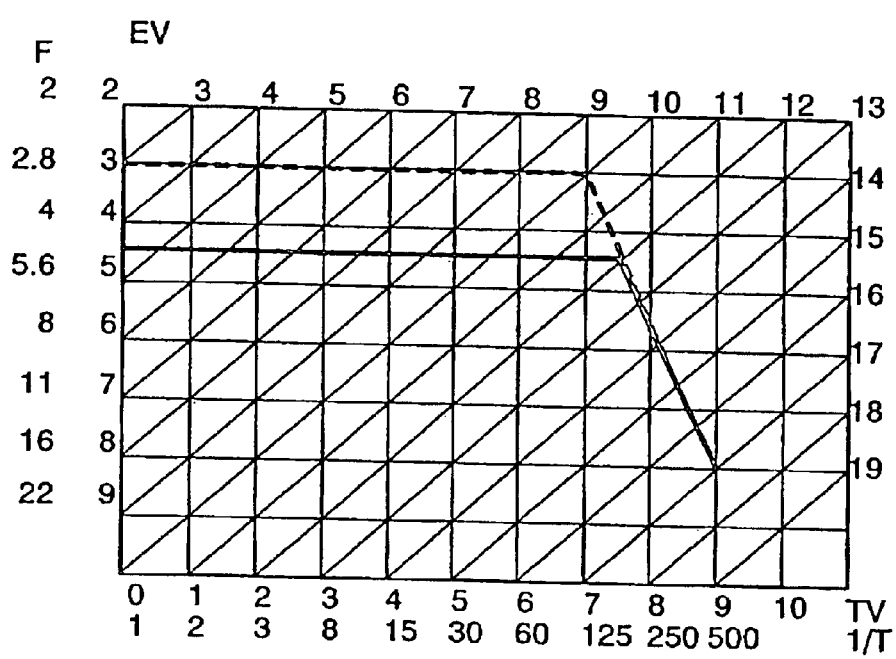
FIG. 5 is a typical program diagram of programs showing a combination of an aperture value and shutter speed corresponding to each EV, for a conventionally known camera (not shown) comprising a zoom lens.

FIG. 5 is a typical program diagram of programs showing a combination of an aperture value and shutter speed corresponding to each EV, for a conventionally known camera (not shown) comprising a zoom lens.

In the program diagram shown in FIG. 5, the axis of abscissas indicates the shutter speed, the axis of ordinates indicates the aperture value, and diagonal lines indicate EVs.

Then, two photograph films with different ISO sensitivities are compared. If these photograph films have an equal shutter speed and an equal aperture value, the LV of the photograph film with an ISO sensitivity of 100 is equal to the EV thereof. However, the required quantity of light applied to the photograph film is in inverse proportion to the ISO sensitivity of the photograph film. Consequently, when the sensitivity of the photograph film is increased by one level relative to the ISO sensitivity of 100, the EV increases by one level relative to the LV. For example, if a photograph film with an ISO sensitivity of 100 is used, its EV is 5 if its LV is 5. However, if a photograph film with an ISO sensitivity of 800, which is three levels higher than the ISO sensitivity of 100, is used, then its EV is 8 if its LV is 5.

The program diagram shown in FIG. 5 shows an example of a wide focal distance of a conventionally known camera comprising a zoom lens. Further, this camera comprises a diaphragm aperture regulating mechanism that regulates the aperture so as to deal with a decrease in quantity of peripheral light as described in the prior art section in the case of a wide focal distance.

Of the two programs shown in FIG. 5, the one shown by a solid line sets an aperture regulation for the diaphragm. When the aperture regulation is active, the aperture value F is regulated to 4.5.

On the other hand, the other program, shown by a broken line, clears the aperture regulation for the diaphragm. This program sets the aperture value F at 2.8. Of course, if the aperture regulation is inactive, the quantity of peripheral light decreases markedly. Accordingly, the aperture regulation is kept active if a photograph is taken in a well-lighted place, e.g. outdoors.

On the other hand, if a photograph is taken in a dark place, e.g. a night view is photographed, the background is so dark that a decrease in quantity of peripheral light is not marked in many scenes. If a photograph is taken in such a place, the F value of the lens is desirably reduced in order to prevent image shakes. Thus, when a photograph is taken in a dark place, e.g. a night view is photographed, the camera of this embodiment enables a bright photograph to be taken by deactivating the aperture regulation.

Figure 6A:
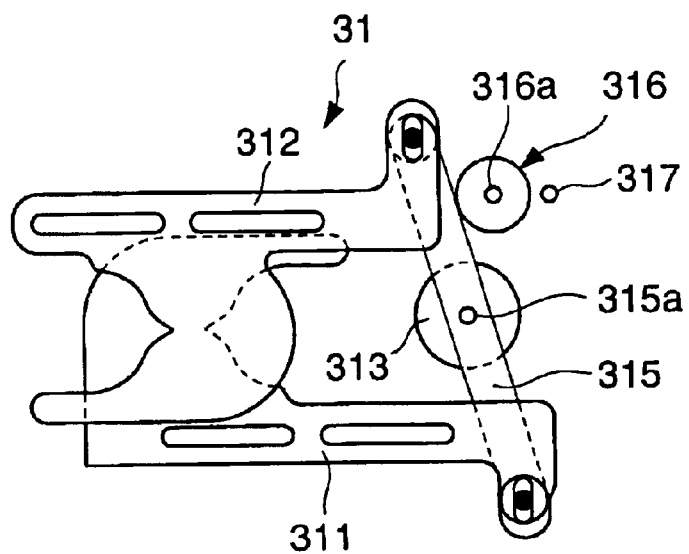
FIGS. 6A, 6B and 6C are schematic views of a shutter mechanism provided in the camera of this embodiment and allowing the aperture to be regulated.
Figure 6B:
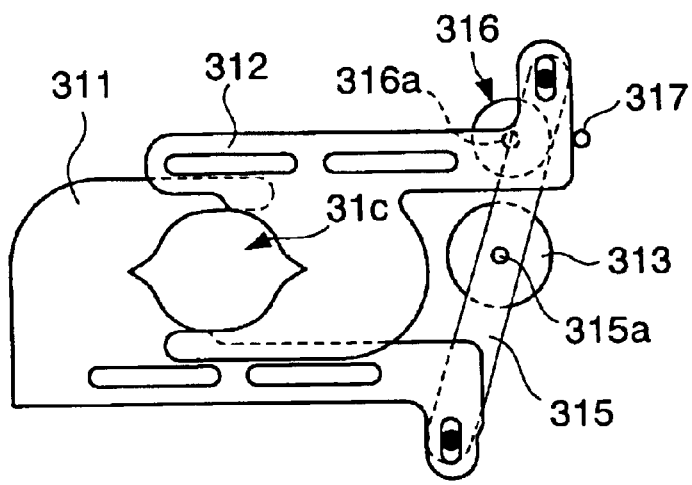
Figure 6C:
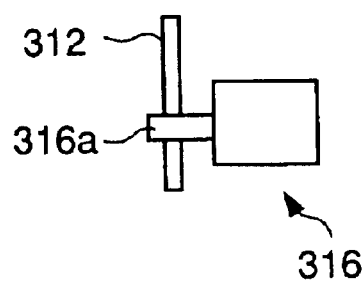

FIGS. 6A, 6B and 6C are schematic views of a shutter mechanism provided in the camera of this embodiment and allowing the aperture to be regulated.

A shutter mechanism 31 also acting as a diaphragm mechanism, shown in FIGS. 6A and 6B, is composed of two shutter blades 311, 312, an arm member 315 joining these two shutter blades together, a plunder 316 from which a pin 316a is projected, and a standing pin 317 against which the shutter blade 312 is abutted if the diaphragm aperture is largest.

The arm member 315 rotationally moves around a portion 315a thereof to which a rotating shaft of a drive motor 313 is directly coupled.

The pin 316a is projected from the plunger 316, thereby reducing the range in which one 312 of the two shutter blades can operate. This regulates the size of the diaphragm aperture formed by the two shutter blades.

FIG. 6A shows that the diaphragm aperture 31c is fully closed. The aperture is fully closed by rotating the rotating shaft of the drive motor 313 counterclockwise.

In the state shown in FIG. 6A, if the rotating shaft of the drive motor 313 is rotated clockwise, the diaphragm aperture 31c is opened up to its maximum size as shown in FIG. 6B when the LV is small. This maximum aperture (in the camera of this embodiment, corresponding to F 2.8) corresponds to a first maximum aperture according to the present invention.

With the shutter mechanism 31, this maximum diaphragm aperture is formed by moving one 312 of the two shutter blades so as to increase the diaphragm aperture until the shutter blade 312 abuts against the standing pin, described previously.

The shutter mechanism 31 opens or closes the shutter blades at a shutter speed determined by the AE arithmetic circuit. The shutter blades are opened or closed by the driver 33 by controlling the drive motor 313 according to an instruction from the CPU 1 so that the opening or closing operation is performed at the shutter speed determined by the AE arithmetic circuit. FIG. 6C shows the shutter mechanism 31 as viewed from the right. This figure shows that the plunger 316 protrudes pin 316a to a position at which it comes into contact with the shutter blade 312 abutted against the standing pin 317. The pin 316a, protruded by the plunger 316 inside the standing pin 317 (on the left of the standing pin 317 in FIGS. 6A and 6B), will be described later in detail.

FIG. 7 is a program diagram showing a combination of an aperture value and shutter speed corresponding to each EV, for the camera of this embodiment.

The program diagram shown in FIG. 7 shows six programs used depending on a set ISO sensitivity if one of the operation section 18b of the zoom operation lever 18 (see FIG. 3) is depressed to set the zoom lens 11a to use a short focal distance. In this program diagram, the axis of abscissas indicates the shutter speed, the axis of ordinates indicates the aperture value of the zoom lens 11a, and diagonal lines indicate EVs.

The programs shown in FIG. 7 by a solid or broken line indicate the contents of control provided at a film sensitivity between ISO50 and ISO1600.

Of the programs shown in FIG. 7 by a solid or broken line, the one shown by the solid line is for the film sensitivity of ISO1600 and provides the same control as the program shown in FIG. 5 by a solid line, until the EV reaches 9.5 (the LV reaches 5.5), the latter program control setting the aperture regulation for the diaphragm. The LV of 5.5 corresponds to a scene darker than one of the interior of a house, i.e. a night scene.

According to this aperture regulation, as shown in FIG. 6C, the plunger 316 protrudes the pin 316a so that the moving range of the shutter blade 312 is regulated to inside the pin 316a. If the pin 316a is not protruded, the shutter blade 312 can move to the standing pin 317. When the pin 316a is protruded, the maximum aperture of the diaphragm becomes slightly smaller than the one shown in FIG. 6B.

With the camera of this embodiment, when the focal distance of the zoom lens 11a decreases, the CPU 1 instructs the driver to have the plunger 316 to protrude the pin 316a in order to regulate the diaphragm aperture. Further, a table corresponding to the current focal distance of and aperture regulation for the zoom lens 11a is referenced to determine a shutter speed.

Furthermore, it is assumed that the field gradually becomes darker. Then, with the camera of this embodiment, even if the focal distance of the zoom lens is short, when the measured light value LV is equal to or smaller than 5.5, the pin 316a, which has been protruded, is withdrawn to clear the aperture regulation for the diaphragm to reduce the aperture value from F 4.5 to F 2.8. Then, the shutter speed is reduced to control exposure. In this case, the maximum aperture (in the camera of this embodiment, corresponding to F 4.5) that can be formed on the basis of the aperture regulation corresponds to a second maximum aperture according to the present invention.

For a film with a sensitivity other than ISO1600, i.e. a sensitivity between ISO800 and ISO50, the aperture regulation is cleared by following one of the programs arranged so that the corresponding shutter speed sequentially decreases by an amount equal to an EV of 1 as shown in FIG. 7 by broken lines.

As described above, when a photograph is taken in a dark place, a bright photograph is obtained by clearing the aperture regulation to reduce the F value. With the camera 10 of this embodiment, if the film sensitivity is ISO1600, the exposure value EV is 8 at a shutter speed of 1/30 second, so that the light value LV with which photographing is possible at a shutter speed of 1/30 second or slower is 4. With the conventional camera shown in FIG. 5 and for which the aperture regulation is carried out regardless of the light value, if the film sensitivity is ISO1600, the brightness with which photographing is possible at a shutter speed of 1/30 second or slower corresponds to an EV of 9.5, i.e. an LV of 5.5. Correspondingly, according to the camera 10 of this embodiment, the range in which a bright photograph can be taken is increased by an amount equal to an aperture value of about 1.5. In this embodiment, the sensitivity of ISO1600 has been illustrated, but the present invention is also applicable to other sensitivities. Consequently, if for example, the shutter speed is limited to 1/30 second or lower in order to prevent image shakes, the range in which a photograph can be taken in a dark place can be extended. Therefore, a night view can be clearly photographed without using any tripod.

In this embodiment, the camera with the zoom lens mounted therein has been described. However, the camera of the present invention is not limited to this camera but may be applied to cameras comprising a photographing lens that allows its focal distance to be switched between a wide angle side and a telephoto side, e.g. cameras comprising a photographing lens that allows photographs to be taken by switching between a wide-angle magnifying power and a telephoto magnifying power.

Further, in this embodiment, the camera with the zoom lens mounted therein has been described. However, the photographing lens of the camera of the present invention may comprise a single-focus lens that does not have a zoom function.

Furthermore, in this embodiment, a photograph is taken on a photograph film. However, the present invention is not limited to this aspect, but a photograph may be taken on a CCD.

As described above, according to the present invention, a camera is provided which can take a bright photograph in a dark place where a decrease in quantity of peripheral light does not affect the resulting photograph.

What is claimed is:

1. A camera comprising a photographing optical system having a variable focal distance and a diaphragm having a maximum aperture regulated, in response to the photographing optical system being set to use a predetermined focal distance or shorter, to a second value smaller than a first value used when the photographing optical system is set to use a predetermined long focal distance, the camera carrying out photographing by capturing object light entered via the photographing optical system and the diaphragm, the camera further comprising:

a photometric section that measures a light value; and
   a diaphragm restriction clearing section that clears an aperture regulation for said diaphragm and sets the aperture of the diaphragm at a value within a range between said first value and said second value depending on the light value measured by said photometric section, the range including the first value itself, if the light value measured by said photometric section is equal to or smaller than a predetermined value.

2. The camera according to claim 1, wherein said diaphragm restriction clearing section sets the aperture of the diaphragm at said first value when the aperture regulation for said diaphragm is cleared.

3. The camera according to claim 1, wherein said diaphragm restriction clearing section clears the aperture regulation for said diaphragm if the light value measured by said photometric section is equal to or smaller than a predetermined value set equal to or smaller than LV6.

4. The camera according to claim 1, wherein the camera has a photosensitized material loaded therein to take a photograph on the photosensitized material.

5. The camera according to claim 1, wherein the aperture is defined by two shutter blades, and an aperture regulation is performed by a movable pin that prevents outward movement of at least one of the two shutter blades.

6. A camera comprising a photographing optical system and a diaphragm which is opened so as to obtain a predetermined first maximum aperture and which has the maximum aperture regulated to a predetermined second value smaller than the first value, the camera carrying out photographing by capturing object light entered via the photographing optical system and the diaphragm, the camera further comprising:

a photometric section that measures a light value; and a diaphragm restriction clearing section that clears an aperture regulation for said diaphragm and sets the aperture of the diaphragm at a value within a range between said first value and said second value depending on the light value measured by said photometric section, the range including the first value itself, if the light value measured by said photometric section is equal to or smaller than a predetermined value.

* * * * *

UNITED STATES PATENT AND TRADEMARK OFFICE
CERTIFICATE OF CORRECTION

PATENT NO. : 6,744,981 B2
DATED : June 1, 2004
INVENTOR(S) : Kiyotaka Kobayashi

It is certified that error appears in the above-identified patent and that said Letters Patent is hereby corrected as shown below:

Title page,
Item [30], Foreign Application Priority Data, please delete the priority document number "2001-280964" and replace it with -- 2001-289064 --

Signed and Sealed this

Thirtieth Day of November, 2004

JON W. DUDAS
*Director of the United States Patent and Trademark Office*